H. BRUNELLE.
SHEARING TOOL.
APPLICATION FILED APR. 10, 1920.
1,360,618.
Patented Nov. 30, 1920.
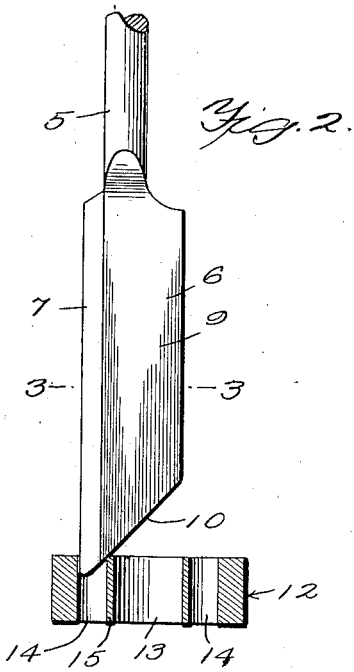
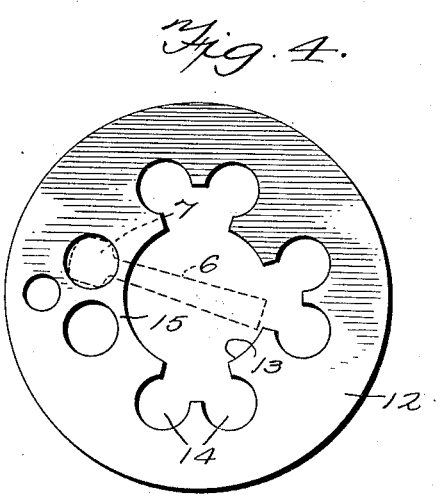
Inventor
Hilera Brunelle
By B. P. Fishburne
Attorney

UNITED STATES PATENT OFFICE.

HILERA BRUNELLE, OF TURNERS FALLS, MASSACHUSETTS.

SHEARING-TOOL.

1,360,618.   Specification of Letters Patent.   Patented Nov. 30, 1920.

Application filed April 10, 1920. Serial No. 372,993.

*To all whom it may concern:*

Be it known that I, HILERA BRUNELLE, a citizen of the United States, residing at Turners Falls, in the county of Franklin and State of Massachusetts, have invented certain new and useful Improvements in Shearing-Tools, of which the following is a specification.

My invention relates to a shearing tool or broach, adapted for use in making taps, dies or the like, while not necessarily restricted to this use.

An important object of the invention is to provide a device of the above mentioned character, which is simple in construction, easy to operate, and will cut the desired material from the die or the like, without injury to the parts of the same.

Other objects and advantages of the invention will be apparent during the course of the following description.

In the accompanying drawings forming a part of this specification, and in which like numerals are employed to designate like parts throughout the same, Figure 1 is a perspective view of a shearing tool, embodying my invention, Fig. 2 is a side elevation of the same, Fig. 3 is a transverse section taken on line 3—3 of Fig. 2, and Fig. 4 is a plan view of a die, showing the tool in dotted lines, and parts of the die cut away.

In the drawings, wherein for the purpose of illustration is shown a preferred embodiment of my invention, the numeral 5 designates the shank of the shearing tool, carrying a blade 6, preferably formed integral therewith. The blade is provided at its rear edge with a longitudinal reinforcing and guiding rib 7, extending laterally upon both sides of the blade. The rib 7 has its outer or rear face 8 preferably curved in cross section. The side faces 9 of the blade 6 are inclined horizontally and converge toward the rib 7, whereby the blade is tapered in horizontal cross section and decreases in thickness toward the rib. The blade 6 is provided at its lower end with a vertically inclined edge 10, forming cutting edges 11, which are inclined horizontally and vertically, by virtue of the inclination of the faces 9 and edge 10.

The numeral 12 designates a die, having the main central opening 13 and radial openings 14, drilled or otherwise formed therein. The numeral 15 designates the material or web between these openings 14.

In operation, the lower end of the tool, as shown in Fig. 2, is presented to the selected opening 14, and the tool forced downwardly. This may be accomplished by securing the shank 5 in the reciprocating element of a press, such as a harbor press, or the shank may be struck by a hammer. The rib 7 enters the opening, and serves to guide the blade 6 downwardly, while this rib also prevents injury to the other parts of the die. The cutting edges 11 shear or cut off metal of the web 15, as is obvious. This cutting action is due to the edges 11 being inclined horizontally and vertically, as before described.

The tool may be formed of any suitable material, such as tool steel, and may be made in any desired size.

It is to be understood that the form of my invention herewith shown and described is to be taken as a preferred example of the same, and that various changes in the shape, size and arrangement of parts may be resorted to without departing from the spirit of my invention, or the scope of the subjoined claims.

Having thus described my invention, I claim:

1. A shearing tool for making dies, taps or the like, comprising a shank, a blade carried by the shank and provided at one edge with a longitudinal guiding and reinforcing rib, said blade having its opposite faces inclined and converging toward the rib, said blade having its forward end transversely inclined.

2. A shearing tool of the character described, comprising a blade provided near one edge with a longitudinal reinforcing and guiding rib, said blade having oppositely arranged inclined faces converging toward the rib, said blade having its forward end cut upon an incline and extending downwardly toward the rib whereby the lower portion of such forward end is adjacent said rib.

3. A shearing tool of the character described, comprising a blade provided near one edge with a longitudinally extending reinforcing and guiding rib, said blade gradually decreasing in thickness toward the rib and having its forward end transversely inclined.

4. A shearing tool of the character described, comprising a blade having inclined faces converging toward one edge of the blade, a longitudinal reinforcing rib at the reduced edge of the blade and extending laterally beyond the same, said blade having its forward end cut upon an incline and extending downwardly toward the rib, said rib projecting forwardly beyond such inclined end.

In testimony whereof I affix my signature in presence of two witnesses.

HILERA BRUNELLE.

Witnesses:
JAMES J. LEARY,
ANNA R. KING.